United States Patent [19]
Rutigliano

[11] Patent Number: 5,237,731
[45] Date of Patent: Aug. 24, 1993

[54] UNIVERSAL TRUCK AXLE SPINDLE REMOVER

[76] Inventor: Joseph M. Rutigliano, 208 Wood Ave., Staten Island, N.Y. 10307

[21] Appl. No.: 942,791

[22] Filed: Sep. 10, 1992

[51] Int. Cl.⁵ .............................................. B25B 27/14
[52] U.S. Cl. ................................................... 29/275
[58] Field of Search ................... 29/254–255, 29/275–277, 271; 173/128

[56] References Cited

U.S. PATENT DOCUMENTS

| | | | |
|---|---|---|---|
| 3,685,126 | 8/1972 | Kane | 29/275 |
| 3,956,801 | 5/1976 | Wood | 29/275 |
| 4,429,447 | 2/1984 | Davis | 29/275 |
| 4,675,968 | 6/1987 | Bartlett | 29/254 |
| 4,984,346 | 1/1991 | Vorhauer | 29/277 |

*Primary Examiner*—Robert C. Watson
*Attorney, Agent, or Firm*—Richard L. Miller

[57] ABSTRACT

A universal truck axle spindle remover is provided and consists of an adjustable housing that will extend diametrically across the rim of the wheel which will align a transverse drive pin punch it slideably carries therein, with the axle so that a sledge hammer can be used to strike the drive pin punch to impact the axle and free it from axle spindle.

4 Claims, 1 Drawing Sheet

UNIVERSAL TRUCK AXLE SPINDLE REMOVER

BACKGROUND OF THE INVENTION

The instant invention relates generally to spindle puller tools and more specifically it relates to a universal truck axle spindle remover.

Numerous spindle puller tools have been provided in the prior art that are adapted to remove the wheel spindles from the axle shafts of motor vehicles. For example, U.S. Pat. Nos. 4,283,827 to Abel; 4,302,873 to Rotman; 4,562,631 to Welch; 4,733,450 to Pool and 4,771,528 to Stromberg all are illustrative of such prior art. While these units may be suitable for the particular purpose to which they address they would not be as suitable for the purpose of the present invention as hereafter described.

SUMMARY OF THE INVENTION

A primary object of the present invention is to provide a universal truck axle spindle remover that will overcome the shortcomings of the prior art devices.

Another object is to provide a universal truck axle spindle remover which will line up with the axle so that the axle can be given an impulse of energy to dislodge it from the wheel as opposed to hitting it with just a hammer.

An additional object is to provide a universal truck axle spindle remover that allows the mechanic better access to impact the axle with a hammer which in turn will free up the spindle.

A further object is to provide a universal truck axle spindle remover that is simple and easy to use.

A still further object is to provide a universal truck axle spindle remover that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
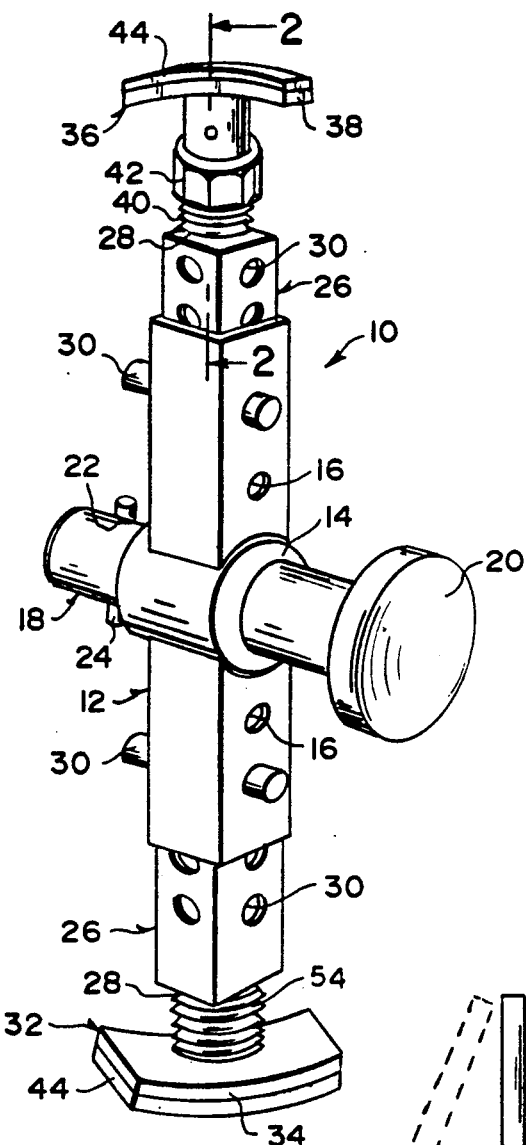
FIG. 1 is a perspective view of the instant invention.
Figure 2:
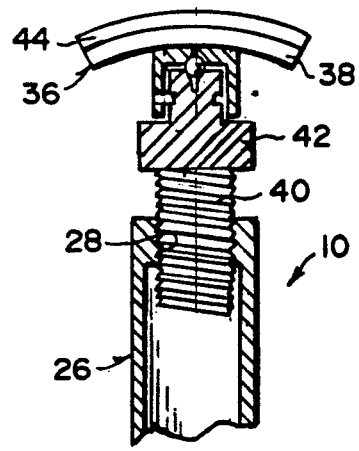
FIG. 2 is a cross sectional view with parts broken away taken along line 2—2 of FIG. 1.
Figure 3:
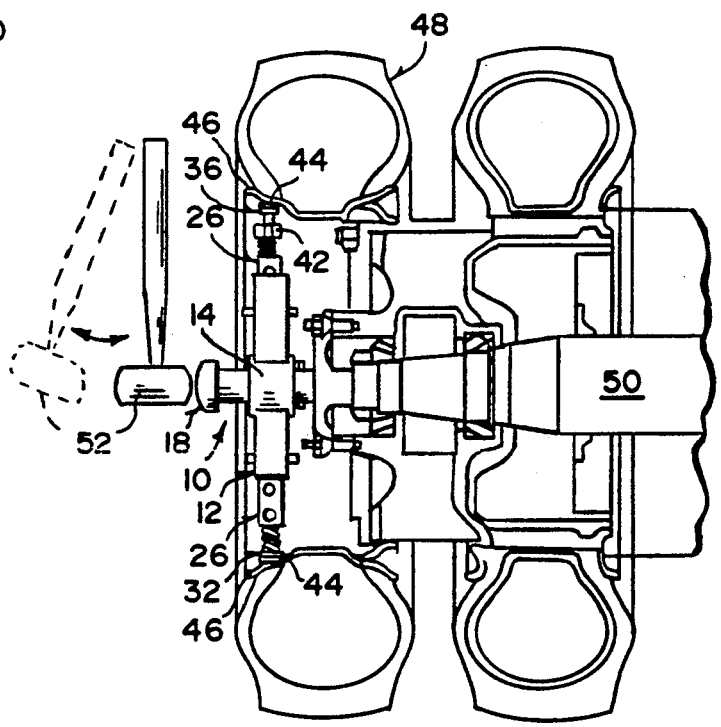
FIG. 3 is a diagrammatic cross sectional view showing the axle spindle remover in use on a double rear wheel assembly.

Turning now descriptively to the drawings, in which like reference characters denote like elements throughout the several views, the Figures illustrate a universal truck axle spindle remover consisting of an elongated main housing 12 having a transverse central sleeve 14 and a plurality of spaced apart apertures 16 therealong. A drive pin punch 18, has an enlarged head 20 at one end and a transverse aperture 22 proximate the other end. The drive pin punch 18 is insertable and slideable through the central sleeve 14 of the main housing 12. A safety pin 24 is insertable within the transverse aperture 22 in the drive pin punch 18 after the drive pin punch 18 is inserted through the central sleeve 14. A pair of legs 26, are also provided with each having a threaded bore 28 at one end and a plurality of spaced apart apertures 30 therealong. Each leg 26 is insertable into one end of the main housing 12 so that the end with the threaded bore 28 extends out from the main housing 12. A pair of adjusting pins 30, are provided with each insertable through one of the apertures 16 in the main housing 12 and one of the apertures 30 in one of the legs 26 so as to adjustably retain the legs 26 in the main housing 12. A lower centering adjustment foot 32 has a curved plate 34 and a threaded shank 54, which is threaded into the threaded bore 28 in the end of one of the legs 26. An upper foot 36, has a curved plate 38 and a threaded shank 40 with an adjustable octagon-shaped head 42, which is threaded into the threaded bore 28 in the end of the other leg 26. A pair of gripping elements 44 are provided. One gripping element 44 is affixed to the curved plate 34 of the lower foot 32, while other gripping element 44 is affixed to the curved plate 38 of the upper foot 36. The gripping element 44 on the lower foot 32 and the gripping element 44 on the upper foot 36 can bear against a rim 46 of a wheel 48 when the octagon-shaped head 42 is adjusted with a wrench (not shown). With the drive pin punch 18 in alignment with the axle 50, a sledge hammer 52 can be used strike the drive pin punch 18 to impact the axle 50 and free it from the spindle.

The main housing 12 and the pair of legs 26 are each square-shaped in cross section so that when each leg 26 is inserted within the main housing 12, the leg 26 will not rotate therein, so that the apertures 30 in the leg 26 will align up with the apertures 16 in the main housing 12.

Each gripping element 44 is fabricated out of a resilient material, such as rubber, which will cushion each curved plate 34 and 38 when bearing against the rim 46 of the wheel 48. The main housing 12, the drive pin punch 18, the legs 26, and the feet 32 and 36 all are fabricated out of a durable strong metal material, such as a stainless steel or the like.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A universal truck axle spindle remover which comprises:
   a) an elongated main housing having a transverse central sleeve and a plurality of spaced apart apertures therealong;
   b) a drive pin punch having an enlarged head at one end and a transverse aperture proximate the other end, said drive pin punch insertable and slideable through the central sleeve of said main housing;
   c) a safety pin insertable within the transverse aperture in said drive pin punch after said drive pin punch is inserted through the central sleeve;
   d) a first leg and a second leg, each having a threaded bore at one end and a plurality of spaced apart apertures therealong, said first leg and said second leg each being insertable into a first end and a second end opposite each other of said main housing so that a leg end with the threaded bore each extends out from said main housing;

e) a pair of adjustable pins, each insertable through one of the apertures in said main housing and one of the aperture in one of said legs so as to adjustably retain said legs in said main housing;

f) a lower centering adjustment foot having a curved plate and a threaded shank which is threaded into the threaded bore in one end of said first leg;

g) an upper foot having a curved plate and a threaded shank with an adjustable octagon-shaped head which is threaded into the threaded bore in one end of said second leg; and h) a pair of gripping elements, one said gripping element which is affixed to the curved plate of said lower foot, while other said gripping element is affixed to the curved plate of said upper foot, said gripping element on said lower foot and said gripping element on said upper foot can bear against a rim of a wheel, when the octagon-shaped head is adjusted by a wrench so that with said drive pin punch in alignment with the axle, whereby a sledge hammer can be used to strike said drive pin punch to impact the axle and free it from said axle spindle.

2. A universal truck axle spindle remover as recited in claim 1, wherein said main housing and said legs are each square-shaped in cross section so that when each said leg is inserted within said main housing, said leg will not rotate therein, so that the apertures in said leg will align with the apertures in said main housing.

3. A universal truck axle spindle remover as recited in claim 2, wherein each said gripping element is fabricated out of a resilient material which will cushion each said curved plate when bearing against the rim of the wheel.

4. A universal truck axle spindle remover as recited in claim 3, wherein said main housing, said drive pin punch, said legs, and said feet are all fabricated out of a durable strong metal material.

* * * * *